United States Patent [19]

Carlsson

[11] Patent Number: 4,941,626
[45] Date of Patent: Jul. 17, 1990

[54] BAIL MECHANISM IN AN OPEN-FACE FISHING REEL OF THE FIXED-SPOOL TYPE

[75] Inventor: Karl L. Carlsson, Asarum, Sweden

[73] Assignee: Abu Garcia Produktion AB, Svangsta, Sweden

[21] Appl. No.: 427,435

[22] Filed: Oct. 27, 1989

[51] Int. Cl.$^5$ ............................................. A01K 89/01
[52] U.S. Cl. ...................................................... 242/231
[58] Field of Search ................ 242/230, 231, 232, 233

[56] References Cited

U.S. PATENT DOCUMENTS

| 4,147,313 | 4/1979 | Sazaki | 242/232 |
| 4,792,106 | 12/1988 | Hlava | 242/233 |
| 4,848,695 | 7/1989 | Kaneko | 242/232 |

Primary Examiner—Katherine A. Matecki
Attorney, Agent, or Firm—Browdy and Neimark

[57] ABSTRACT

A bail mechanism in an open-face fishing reel of the fixed-spool type having a rotor and a line spool which is coaxial with the rotor and oscillating in the axial direction, includes a bail for winding a line onto the line spool. By means of two mounting elements, the bail is mounted on two attachments disposed on the rotor diametrically opposite each other. The bail is pivotable about a bail axis at right angles to the axis of the rotor, between a folded-in line winding position and a folded-out position in which the bail is released of the line. One attachment defines an open chamber and has a cover plate detachably mounted over the chamber for closing it. The cover plate has a through hole whose center is located on the bail axis, and carries on its inside a rotary disc having a center pin extending through the hole in the cover plate and carrying the associated mounting element on the outside of the cover plate. A tension spring is provided in the chamber and mounted between an eccentric pin on the rotary disc and a pin on the cover plate. The rotary disc is rotatable against the action of the tension spring between two positions corresponding to the folded-out position and the folded-in position of the bail.

4 Claims, 3 Drawing Sheets

FIG.~1 PRIOR ART

BAIL MECHANISM IN AN OPEN-FACE FISHING REEL OF THE FIXED-SPOOL TYPE

FIELD OF THE INVENTION

The present invention relates to a bail mechanism in an open-face fishing reel of the fixed-spool type.

DESCRIPTION OF THE PRIOR ART

Prior art fishing reels of this type have a spindle rotatably and axially displaceably mounted in a housing and carrying a line spool at one end thereof. The line spool is non-rotatably connected to the spindle and axially fixed thereon. A drive shaft extending at right angles to the spindle is mounted in the housing to be rotated by means of a handle. Oscillating means are connected to the drive shaft and the spindle. When the handle is rotated for retrieving a fishing line fixed on the line spool, the drive shaft rotates and drives the oscillating means, in turn oscillating the spindle and, thus, the line spool in the longitudinal direction of the spindle. Through a gear transmission provided in the housing, the handle drives a hollow shaft which projects from the housing and is coaxial with the spindle extending through the shaft. The hollow shaft then drives a rotor non-rotatably mounted thereon and carrying a bail mechanism for winding the line onto the line spool. During line retrieve, the line is thus wound onto the line spool which, as opposed to the rotor, does not rotate, but instead executes an axial oscillatory movement. In this manner, the line will be distributed across the line spool.

A known bail mechanism has a bail for winding the line onto the line spool and two attachments provided on the rotor diametrically opposite each other. At its ends, the bail is pivotally fixed to the attachments by means of mounting elements. To permit pivotal movement of the bail, the mounting elements are rotatably connected to the attachments by screws forming a bail pivot shaft at right angles to the spindle. The bail is pivotable between an operative folded-in position in which it extends substantially at right angles to the spindle, and an inoperative folded-out position in which it is located on the opposite side of the spindle and makes an angle therewith which is of the order of 45°. The bail is maintained in its two positions by a torque spring mounted in one of the attachments under a cover fixed thereon. The torque spring has two projections, one of which engages in a hole in the attachment and the other of which engages in a hole in the associated mounting element.

This prior art bail mechanism suffers from the drawback that the torque spring is subjected to so substantial stresses that it soon becomes fatigued and breaks and therefore needs exchanging at relatively frequent intervals. Such an exchange of the torque spring is complicated and time-consuming because, among other things, the two projections of the torque spring must be fitted into the holes in the attachment and the mounting element.

SUMMARY OF THE INVENTION

The object of the present invention is to overcome the above-mentioned drawback and provide a bail mechanism which is so designed as to permit replacing the torque spring with a tension spring of higher strength and make it possible to easily mount and exchange the different components.

According to the present invention, this object is achieved by means of a bail mechanism in an open-face fishing reel of the fixed-spool type having a housing, a rotor mounted on said housing, and a line spool coaxial with said rotor and adapted to oscillate in the axial direction, said bail mechanism comprising a bail for winding a line onto said line spool;

two attachments arranged on said rotor substantially diametrically opposite each other; and two mounting elements carrying said bail and being so rotatably mounted on a respective one of said attachments that said bail is pivotable about a bail axis substantially at right angles to the axis of said rotor, between a folded-in line winding position and a folded-out position in which said bail is released of the line;

at least one of said attachments being designed so as to form an open chamber and having a cover plate detachably mounted over said chamber for closing it;

said cover plate having a through hole whose center is located on said bail axis, and supporting on its inside a rotary disc having a center pin extending through said hole in said cover plate and non-rotatably connected to the associated mounting element for carrying this element on the outside of said cover plate;

a tension spring being mounted between two spring holders, one of which is eccentrically mounted on the side of said rotary disc facing said chamber, and the other of which is mounted on the inside of said cover plate; and said rotary disc being rotatable against the action of said tension spring, between two positions corresponding to said folded-out and said folded-in position of said bail.

BRIEF DESCRIPTION OF THE DRAWINGS

The invention will now be described in more detail with reference to the accompanying drawings, in which.

DETAILED DESCRIPTION OF THE INVENTION

Figure 1:
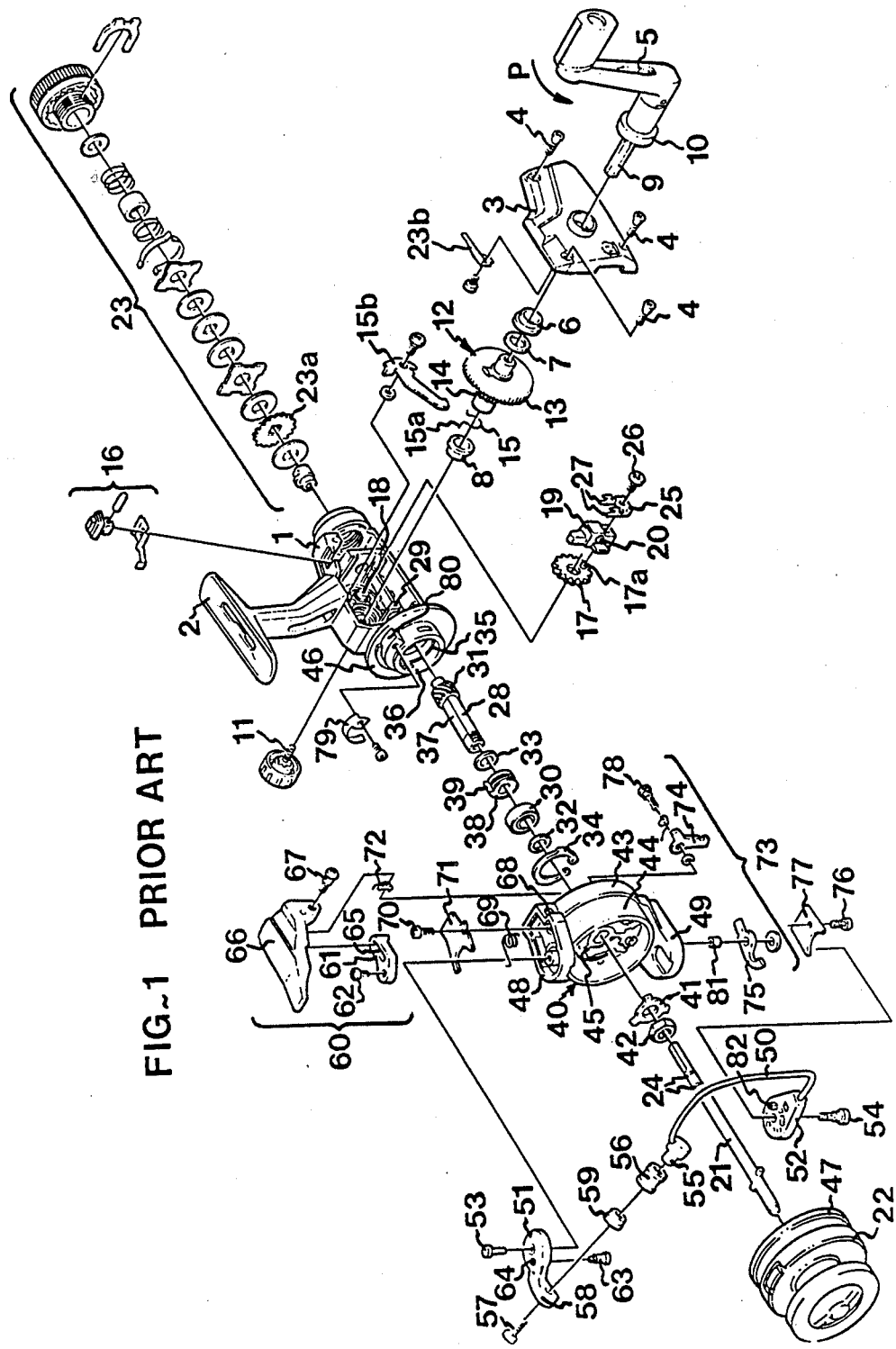
FIG. 1 is an exploded view showing a prior art open-face fishing reel of the fixed-spool type which is provided with the known bail mechanism briefly described above.

The known open-face fishing reel of the fixed-spool type shown in FIG. 1 has a housing 1 with a foot 2 for securing the fishing reel on a fishing rod. The housing 1 has a side plate or cover 3 fixed to the housing by screws 4. A handle 5 is rotatably mounted in the cover 3 by means of a support bearing 6 and a bearing washer 7, and in the opposite side wall of the housing 1 by means of a support bearing 8. The shaft 9 of the handle 5 is axially fixed by means of a shoulder 10 on the handle side and a screw 11 with a knob-like head on the opposite side. The screw 11 is screwed in a threaded axial bore in the free end of the shaft 9. The shaft 9 has square cross-section throughout the major part of its length and non-rotatably carries a gear unit 12. The gear unit 12 comprises a driving gear 13 with axially directed teeth on its side facing away from the cover 3, and a smaller driving gear 14. Between the two driving gears 13 and 14, the unit 12 has a cylindrical portion (not shown) with an annular circumferential groove for receiving a spring 15. The spring 15 has an axially directed leg 15a cooperating with a pawl 15b pivotally fixed in the housing 1 so as to form a so-called silent anti-reverse which can be engaged and disengaged by means of a mechanism 16.

An oscillating gear 17 is mounted on a bearing pin 18 extending into the housing 1 from the wall thereof opposing the cover 3. The gear 17 meshes with the smaller driving gear 14 and has an axially directed eccentric pin 17a engaging in a vertical groove (not shown) in a driver element 19. The driver element 19 has a through bore 20 through which a spindle 21 extends. The spindle 21 is rotatably and axially displaceably mounted in the housing 1 and non-rotatably carries a line spool 22 on its end projecting from the housing 1. At its other end, the spindle 21 engages a brake mechanism 23, not described in more detail here, which comprises, inter alia, a toothed wheel 23a for cooperating with a click spring 23b fixed on the cover 3.

The spindle 21 has two annular circumferential grooves 24 between which the driver element 19 is mounted by means of a mounting element 25 fixed to the driver element 19 by a screw 26. The mounting element 25 has two legs 27 engaging in the grooves 24 in the spindle 21, such that the driver element 19 is axially fixed on the spindle 21 which is however rotatable relative to the driver element.

The spindle 21 also rotatably extends through a rotor shaft 28 considerably shorter than the spindle. The rotor shaft 28 is rotatably mounted in a support bearing (not shown) in an internal flange 29 in the housing 1 and in a ball bearing 30 in the end wall of the housing 1 opposite the brake mechanism 23. On its inner end, the rotor shaft 28 carries a gear 31 non-rotatably connected thereto and meshing with the larger driving gear 13. The ball bearing 30 is surrounded by two spacer washers 32 and 33 and maintained in place by a locking washer 34 engaging in an inner groove 35 in a sleeve 36 axially projecting from said end wall of the housing 1. The rotor shaft 28 has two diametrically opposed planar surfaces 37 forming a so-called flat and non-rotatably carrying a ring 38 between the ball bearing 30 and the spacer washer 33. The ring 38 has a radial stop lug 39 for cooperating with the pawl 15b.

On its outer end, the rotor shaft 28 non-rotatably carries a rotor 40 secured to the rotor shaft by a locking washer 41 and a nut 42. The rotor 40 substantially has the form of a cylinder divided into two cylinder parts 43 and 44 by an inner wall 45. The cylinder part 43 surrounds an annular flange 46 radially projecting from the sleeve 36, and the cylinder part 44, having a smaller outer diameter than the cylinder part 43, is surrounded by a sleeve 47 axially projecting from the line spool 22.

The rotor 40 has two diametrically opposed attachments 48 and 49 integrally formed with the cylinder part 43 and extending axially over the cylinder part 44 at a certain radial distance therefrom. A bail 50 is pivotally fixed at its ends to the attachments 48 and 49 by means of mounting elements 51 and 52. To permit pivotal movement of the bail 50, the mounting elements 51 and 52 are rotatably connected to the attachments 48 and 49 by screws 53 and 54 forming a pivot shaft for the bail at right angles to the spindle 21. The bail 50 is pivotable between an operative folded-in position which is shown in FIG. 1 and in which it extends substantially at right angles to the spindle 21, and an inoperative folded-out position in which it is located on the opposite side of the spindle 21 and makes an angle therewith which is of the order of 45°.

A bearing pin 55 for a line roller 56 is fixed to one end of the bail 50. This end of the bail is connected to the mounting element 51 by a screw 57 extending through an arm 58 on the mounting element 51 and through a spacer sleeve 59 and screwed in the bearing pin 55.

When turning the handle 5 in the direction of line retrieve P, i.e. in the direction in which a fishing line (not shown) fixed to the line spool 22 is wound onto the line spool, the larger driving gear 13 drives the gear 31, such that the rotor 40 and, thus, the bail 50 are rotated. At the same time, the smaller driving gear 14 drives the oscillating gear 17, such that the driver element 19, by the engagement of the eccentric pin 17a in the vertical groove therein, is moved back and forth so as to oscillate the spindle 21 and, thus, the line spool 22 in the longitudinal direction of the spindle. The spindle 21 and the line spool 22 are however not rotated during line retrieve. The fishing line runs over the line roller 56 on the folded-in bail 50 and is wound onto the line spool 22 during the rotation of the bail. Since the line spool 22 is oscillated during the line winding operation, the line is distributed axially across the line spool.

Before a cast is to be made, the bail 50 is pivoted to the folded-out position so as to release the line from the line roller 56. During the cast, the line is paid out from the line spool 22 which, like the rotor 40, remains still during the cast. When line retrieve is again to be effected after the cast, the bail 50 is automatically swung back to the folded-in position, and the line is placed on the line roller 56.

The bail 50 can be seized with one hand for pivoting from the folded-in position to the folded-out position. Preferably, the bail 50 is however swung to the folded-out position before a cast by means of a trigger mechanism 60 mounted on the attachment 48 and engaging the mounting element 51.

The trigger mechanism 60 comprises an angle arm 61 one leg of which is rotatably connected to the mounting element 51 by a screw 62 screwed in a sleeve 63 extending through an eccentrically located hole 64 in the mounting element 51. The angle arm 61 has a longitudinal groove 65 in its other leg. The trigger mechanism 60 further comprises a trigger 66 pivotally connected to the attachment 48 by a screw 67 screwed in a hole 68 in one side wall of the attachment 48. On its side facing the attachment 48, the trigger 66 has a projection (not shown) engaging in the groove 65. When the trigger 66, for instance by the index finger, is pivoted a short distance away from the attachment 48 about its pivot shaft formed by the screw 67, the mounting element 51 will be rotated in such a direction that the bail 50 is swung to its folded-out position. The bail 50 is maintained in its folded-out position, as in its folded-in position, by a torque spring 69 mounted in the attachment 48 underneath a cover 71 fixed thereto by a screw 70. When the trigger 66 is released, it is returned to its initial position by a spring 72, so that its projection moves freely in the groove 65 without returning the mounting element 51.

In order to bring the trigger 66 into a suitable position for index-finger actuation prior to a cast, the handle 5 is turned in the direction opposite to the direction of line retrieve P, the rotor shaft 28 and, thus, the ring 38 non-rotatably mounted thereon being rotated until the stop lug 39 encounters the pawl 15b and further rotation of the handle 5 in the direction opposite to the direction of line retrieve P thus is prevented. In this stop position, the trigger 66 is in a suitable position for index-finger actuation, which is a position substantially diametrically opposed to the position shown in FIG. 1.

The above-mentioned automatic return of the bail 50 to its folded-in position as soon as line retrieve is commenced after a cast, is brought about by means of a return mechanism 73. The mechanism 73 comprises a spring-loaded angle arm 74 provided within the cylinder part 43, and a lever 75 provided in the attachment 49 underneath a cover 77 fixed thereto by a screw 76. The angle arm 74 is rotatably mounted on the wall 45 separating the cylinder parts 43 and 44 from each other, by means of a screw 78 defining an axis of rotation for the angle arm parallel to the spindle 21. One leg of the angle arm 74 extends through a slot (not shown) in the wall of the cylinder part 43 into the attachment 49 while its other leg is located in the cylinder part 43 for cooperating with a cam curve 80, provided with a wear plate 79, on the fixed sleeve 36. The lever 75 is rotatable about a pin 81 parallel to the screw 54 about which the mounting element 52 is rotatable. The mounting element 52 has an eccentrically disposed projection 82 cooperating with one lever arm of the lever 75. The other lever arm of the lever 75 cooperates with the leg of the angle arm 74 extending into the attachment 49. When line retrieve is commenced after a cast, the rotor 40 is rotated, the cam curve 80 acting on the angle arm 74 which in turn acts on the lever 75 in such a direction that, by cooperating with the projection 82, it will pivot the bail 50 to its folded-in position.

In the known fishing reel described above, the bail mechanism, because of the use of a torque spring 69, suffers from the shortcoming stated by way of introduction.

Figure 2:
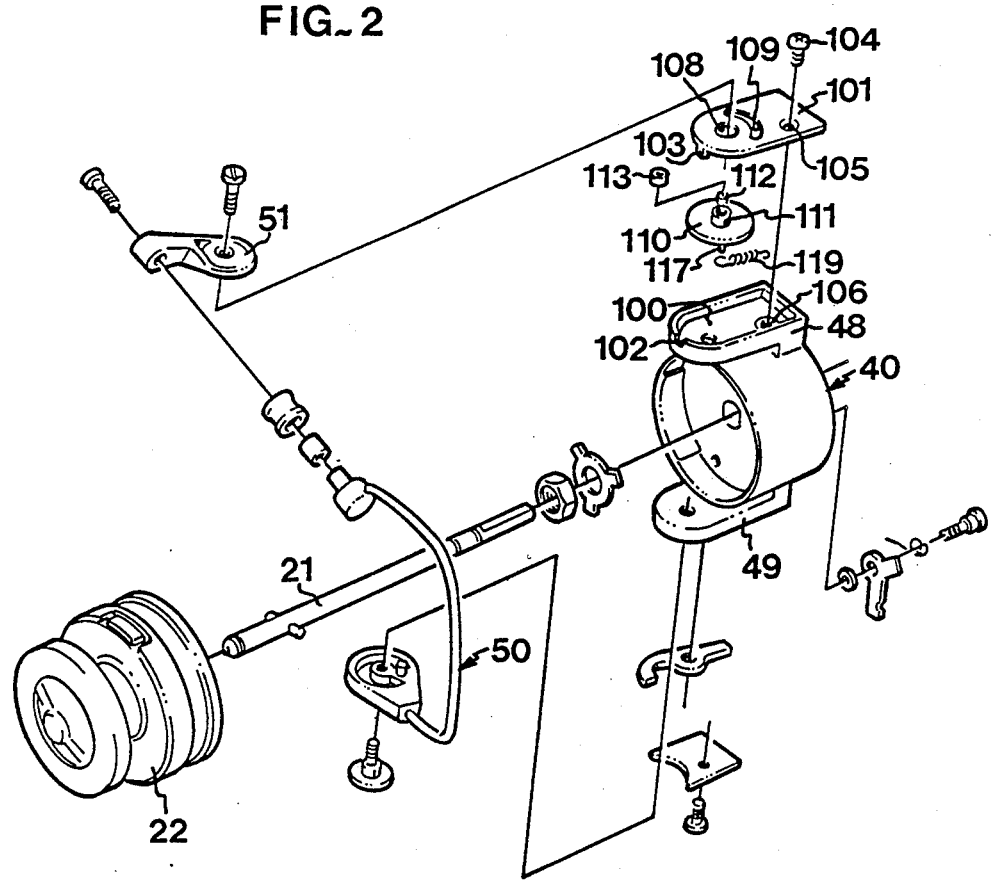
FIG. 2 is a partial exploded view showing an open-face fishing reel of the fixed-spool type which is provided with a bail mechanism according to the present invention, and illustrating only the part of the fishing reel of particular interest for the invention.
Figure 3:
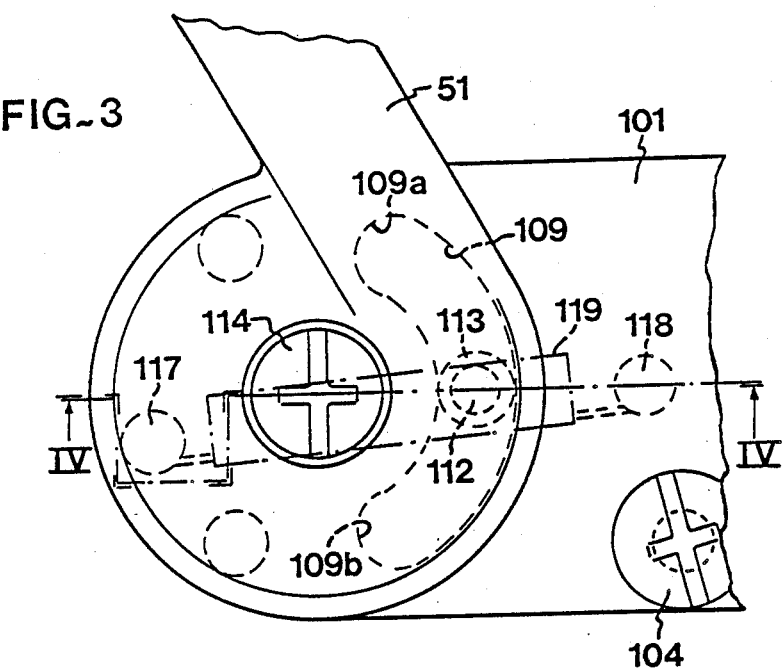
FIG. 3 is a partial top plan view showing a bail mechanism according to the present invention.
Figure 4:
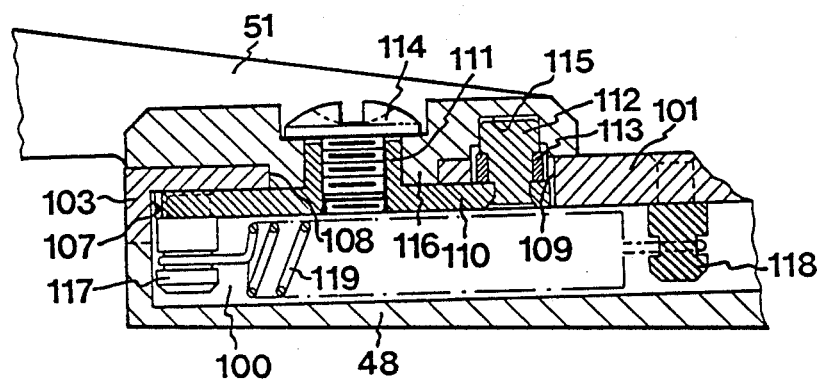
FIG. 4 is a sectional view taken along the line IV—IV in FIG. 3.

An open-face fishing reel of the fixed-spool type provided with a bail mechanism according to the present invention will now be described in more detail with reference to FIGS. 2-4. FIG. 2, corresponding to FIG. 1, illustrates only that part of the fishing reel which is of particular interest in the present invention. The components of the fishing reel not shown in FIG. 2 and not described in more detail with reference to FIGS. 2-4 are essentially similar to the corresponding components in the fishing reel of FIG. 1. It should however be pointed out that the fishing reel according to FIG. 2 has no trigger mechanism, that is the components designated 60-68 in FIG. 1. It should also be noted that the bail mechanism according to the present invention can of course be used in open-face fixed-spool fishing reels of a design other than that shown in the drawings.

The attachment 48 of the bail mechanism according to the present invention is so designed as to form an open chamber 100 and has a cover plate 101 detachably mounted over the chamber for closing it. In its front portion, the attachment 48 has a recess 102, and the cover plate 101 is provided on its underside with a mating lug 103 engaging in the recess 102. The cover plate 101 is fixed to the attachment 48 by a screw 104 extending through a hole 105 in the cover plate and screwed in a threaded bore in a base 106 provided in the chamber 100 adjacent one side wall thereof.

At its front portion, the cover plate 101 has a circular recess 107 which is formed in the underside of the cover plate and whose center is positioned on the pivot axis of the bail 50. A hole 108 extends through the cover plate 101 at the center of the recess 107. Behind the hole 108, the cover plate 101 has a circular-arc-shaped slot 109 whose center of curvature is also positioned on the pivot axis of the bail 50 and whose circumferential extent is about 150°.

A rotary disc 110 whose thickness is equal to the depth of the circular recess 107 and whose diameter is essentially equal to the diameter of the recess is mounted therein. The rotary disc 110 is provided with a center pin 111 whose diameter is smaller than that of the hole 108 and which rises through the hole, and with a driver pin 112 rising through the slot 109. A damping rubber sleeve 113 is mounted on the pin 112 and extends over the portion thereof which is located in the slot 109.

The mounting element 51 is connected to the attachment 48 by a screw 114 corresponding to the screw 53 in FIG. 1 and screwed in a threaded hole in the center pin 111.

In its underside, the mounting element 51 has a dead hole 115 in which the driver pin 112 engages. In its underside, the mounting element 51 further has a protruding sleeve 116 extending down into the annular space between the center pin 111 and the wall of the hole 108.

The rotary disc 110 is provided on its underside with a downwardly projecting pin 117 located adjacent the periphery of the rotary disc. The cover plate 101 is provided on its underside with a corresponding pin 118 located in the rear portion of the cover plate. A tension spring 119 is mounted between the two pins 117 and 118.

The rotary disc 110 is rotatable between a first position in which the driver pin 112 with its rubber sleeve 113 engages one end wall 109a of the slot 109 and which corresponds to the folded-in position of the bail 50, and a second position in which the driver pin 112 with its rubber sleeve 113 engages the other end wall 109b of the slot 109 and which corresponds to the folded-out position of the bail 50. FIG. 3 shows the rotary disc 110 during rotation thereof in an intermediate position. The rotary disc 110 is maintained in its two end positions by the tension spring 119.

As will be evident, the cover plate 1 and the components mounted thereon form a unit.

If the tension spring 119, which has a higher strength than a corresponding torque spring, for some reason or other need be replaced, the screw 114 is loosened and the mounting element 51 is removed. The screw 104 is thereafter loosened, and the cover plate 101 and the components mounted thereon, i.e. the rotary disc 110 and the tension spring 119, are removed as a single unit. The tension spring 119 is hooked off the pins 117 and 118 and is replaced by a new tension spring. The mounting operation is thereafter carried out in reverse order. Removing the old spring, like mounting the new one, is an extremely simple operation.

A special advantage provided by the bail mechanism described above is that a cushioned engagement is achieved as the driver pin 112 equipped with the rubber sleeve 113 reaches its end positions in the slot 109.

What I claim and desire to secure by Letters Patent is:
1. A bail mechanism in an open-face fishing reel of the fixed-spool type having a housing, a rotor mounted on said housing, and a line spool coaxial with said rotor and adapted to oscillate in the axial direction, said bail mechanism comprising a bail for winding a line onto said line spool;

two attachments arranged on said rotor substantially diametrically opposite each other; and two mounting elements carrying said bail and being so rotatably mounted on a respective one of said attachments that said bail is pivotable about a bail axis substantially at right angles to the axis of said rotor, between a folded-in line winding position and a folded-out position in which said bail is released of the line;

at least one of said attachments being designed so as to form an open chamber and having a cover plate detachably mounted over said chamber for closing it;

said cover plate having a through hole whose center is located on said bail axis, and supporting on its inside a rotary disc having a center pin extending through said hole in said cover plate and non-rotatably connected to the associated mounting element for carrying this element on the outside of said cover plate;

a tension spring being mounted between two spring holders, one of which is eccentrically mounted on the side of said rotary disc facing said chamber, and the other of which is mounted on the inside of said cover plate; and said rotary disc being rotatable against the action of said tension spring, between two positions corresponding to said folded-out and said folded-in position of said bail.

2. Bail mechanism as claimed in claim 1, wherein said cover plate has a circular-arc-shaped through slot, said rotary disc being provided on its side facing away from said chamber, with an eccentrically mounted driver pin extending through said slot in said cover plate so as to engage said mounting element.

3. Bail mechanism as claimed in claim 2, wherein the driver pin of said rotary disc in the portion thereof which is located in said slot has a damping sleeve of resilient material.

4. Bail mechanism as claimed in claim 1, wherein said rotary disc is provided in a recess at the inside of said cover plate.

* * * * *